Sept. 29, 1931. J. LEDWINKA 1,825,323
COMBINED BODY AND CHASSIS CONSTRUCTION
Filed June 2, 1928

INVENTOR:
JOSEPH LEDWINKA.
BY
ATTORNEY.

Patented Sept. 29, 1931

1,825,323

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

COMBINED BODY AND CHASSIS CONSTRUCTION

Application filed June 2, 1928. Serial No. 282,498.

The invention relates to a combined chassis and body construction, and particularly to such a construction in which the body and chassis are separately constructed and assembled in final assembly to provide a unitary combined body and chassis structure.

It is among the objects of my invention to provide a construction of the class described in which the thresholds are very low and in which the flooring and seat structures are also correspondingly low and which is characterized by the easy riding qualities incident to such low hung construction, and also to provide a very secure mounting between body and chassis which is open and accessible for assembling the parts, and further, to provide a construction which can be produced at low cost.

I attain these objects in large part by making the chassis sills conform in contour to the lower side edges of the body to be mounted thereon and in providing the lower side edges of the body with longitudinally extending stampings particularly in their threshold portions, which fit down over the chassis sills, and nest therewith, so that the tops of the thresholds are virtually on a level with the tops of the chassis sills, and the threshold portions of the body structure can readily be secured through their vertically extending arms with the outer side walls of the chassis sills. The flooring can, in this way, be readily arranged on a level with the thresholds either by supporting it directly from the chassis, or, as in the embodiment selected for illustration, by making the threshold portions and also the portions of the longitudinal extending stampings extending into the cowl of downwardly presenting channel section, the inner side walls of which are flanged inwardly to provide the floorboard supporting seats. In the wheel housing region the body may be supported directly on top of the chassis sills by an inturned flange secured thereto.

Other and further objects and advantages and the manner in which they are attained will become apparent with the following detailed description when read in connection with the drawings; in which, Fig. 1 is a sectional plan view of the combined body and chassis according to one embodiment of my invention, the section being taken along the line 1—1 of Fig. 2.

Figure 1:
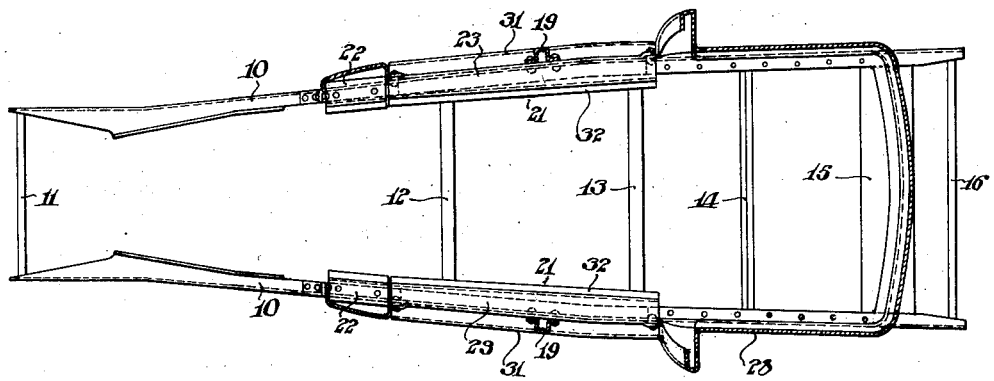
Figure 2:
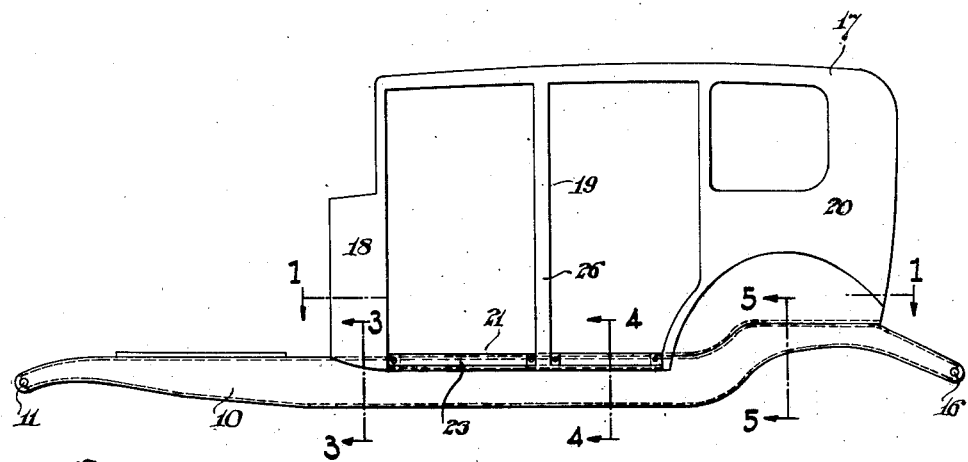
Fig. 2 is a side elevation of the combined body and chassis structure.

According to my invention, the chassis side sills 10 are of the conventional inwardly presenting channel section form but are not, as in the conventional chassis sills, substantially straight from end to end with the body side edges projecting a substantial distance beyond the chassis sills when the body is mounted thereon, but are contoured to conform to the bottom side edges of the body as clearly appears in Fig. 1. The chassis side sills are connected by a number of cross members, as 11, 12, 13, 14, 15 and 16, which serve the purposes of the usual cross members of the chassis and may also have some of the functions of body cross members, such as supporting the seats and flooring. As can be clearly seen in Fig. 2, the chassis sills are made of relatively deep section in their intermediate portions whereby they are strengthened in this region and serve also to take the place of the usual splash boards.

The body superstructure 17, (which may be constructed in separate unitary sub-assemblies and assembled as a unit before it is assembled with the chassis, or in which the separate sub-assemblies, which may consist, as shown of a cowl section 18, intermediate I-form side sections 19 (in the case the sedan type of body shown) and a rear or tonneau section 20, are separately assembled with the chassis as may best suit the arrangements between body builder and car manufacturer,) is formed along its lower side edges to fit over the chassis sills and be secured thereto from end to end of the body structure, so that the body when assembled with the chassis forms a unitary structure therewith.

In the cowl and throughout the threshold portions the lower edge of the body is an angular seating member designated generally by the numeral 21. This angular seating member is formed, in the embodiment shown, of a downwardly presenting channel section, see Figs. 3 and 4, and where the body superstructure is constructed in unitary subassemblies, as shown, it is preferably made in two separate stampings, one of substantially the depth of the cowl, and designated 22, and forming a part of the cowl sub-assembly and the other, designated 23, extending through the threshold portion of the body and forming the thresholds thereof, and forming a part of the intermediate I-shaped sub-assembly.

As shown, the downwardly presenting channel section seating member 22, 23 varies in width from front to rear, its inner side wall 24 being longitudinally straight, while its outer side wall 25 is curved to conform to the contour of the body side. This seating member 22, 23 forms the foundation element of the body superstructure upon which are erected the body posts, as represented by the B—C post 26 and the cowl paneling as 27 and A-post (not shown) and the D-post (not shown) and tonneau paneling 28.

The outer side wall of the channel member is laterally flanged at 29 in its portion 22 and the cowl paneling is flanged under this flange 29 and secured thereto, as by spot welding. In the threshold portion 23, the outer side wall 25 is laterally flanged at 23 and then downwardly at 31, as usual, to form a rabbet to receive the lower edge of a door.

The inner side wall 24 of the channel sections 22 and 23 are laterally flanged at 32 to provide seats for the floor boards 33, which brings the upper surface thereof flush with the bottom wall 34 of the channel members.

Since the chassis sills 10 conform with the side edges of the body and the channel seating members for the body 22, 23 have their outer side walls also conforming to the side edges of the body, when the body superstructure is assembled with the chassis, the chassis sills nest with the downwardly presenting angular seats at the outer portions of the channel members 22, 23, with the bottom walls 34 of the channels resting directly upon the tops of the sills, thereby bringing the thresholds substantially on a level with the tops of the chassis sills, and the outer side walls 25 of the channel seating members overlap the outside walls of the chassis sills to which they are secured, particularly, in the threshold portions, as by bolts or rivets 35.

Figures 3, 4, 5:
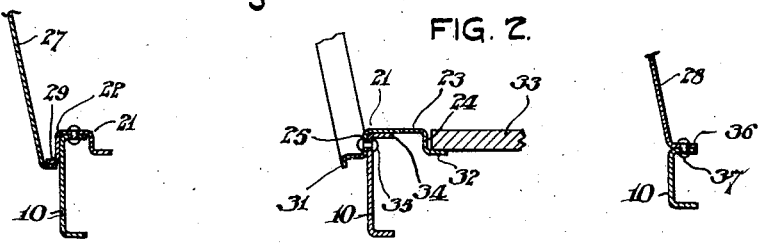
Figs. 3, 4 and 5 are sectional detail views taken, respectively, on the correspondingly numbered lines of Fig. 2.

In the cowl portion 22 where the lateral flange 29 is quite narrow and tapers from the rear forwardly, the connection between the body and sill may be more readily made through the bottom of the channel 22 and the top side wall of the chassis sill, as shown in Fig. 3, but here also, if desired, the connection could be made through the overlapping vertical arms of the chassis sills and the channel.

In the wheel housing portion of the tonneau section 20 the tonneau paneling 28 is flanged inwardly at 36 and rests directly on top of the chassis sills and is secured thereto as by rivets 37, see Fig. 5.

Where the body superstructure is made in separate unit sub-assemblies (as shown) the longitudinally extending members thereof are joined together by suitable final assembly joints, such as the lap joints joining the cowl and tonneau panels to the threshold stamping 23.

By the construction shown and described, the body superstructure rests directly on top of the chassis sills, which are conformed to its lower side edges, from end to end, and is readily secured thereto in the manner shown, to form therewith a unitary combined body and chassis structure in which the parts mutually support and interbrace each other. By the use of it is made possible the ready mounting of various types of bodies upon a chassis underframe and through it are attained low hung construction, a body remarkably free from side sway and characterized by that roominess and those easy riding qualities so desirable in structures of this class, these qualities being attained in a very high degree.

What I claim and desire to secure by letters patent is:

1. In a vehicle construction, a chassis underframe having side sills contoured to the form of the lower edge of the body to be mounted thereon, combined with a body superstructure having threshholds formed solely by a unitary sill stamping of downwardly presenting angular section, one arm of the angle lying directly on top of the chassis sill and another arm overlapping the outside of and conforming to the contour of said side sill and being directly secured thereto.

2. In a vehicle construction, a chassis underframe having side sills contoured to the form of the lower edge of the body to be mounted thereon, combined with a body superstructure having thresholds formed by a downwardly presenting channel section stamping forming the body side sill and seated on said chassis sills with the bottoms of the channel resting directly on the tops of the sills, and the outer side walls of the channels substantially conforming in contour to the contour of said chassis side sills.

3. In a vehicle construction, a chassis underframe having side sills contoured to the form of the lower edge of the body to be mounted thereon, combined with a body superstructure having thresholds formed by a downwardly presenting channel section stampings forming the body side sills and seated on said chassis sills with the bottoms of the channels resting directly on the tops of the sills and flanged laterally at the inner sides to form a floorboard supporting seat supporting the floor boards with their tops substantially level with the bottom wall of the threshholds, the outer side walls of the channel section stampings overlapping and substantially conforming in contour to the chassis sills.

4. In a vehicle construction; a chassis underframe having side sills contoured to the form of the lower edge of the body to be mounted thereon, combined with a body superstructure including a cowl and a wheel housing and having its lower side edges formed from the front of the cowl to region of the wheel housing to provide angular seats, said seats nesting with the tops and outer sides of the chassis sills and secured thereto and comprising unitary stampings extending through the threshholds and forming the threshholds of the doors.

5. In a vehicle construction, a chassis underframe having side sills contoured to the form of the body to be mounted thereon, combined with a body superstructure having its lower edge formed with an angular seat from the front of the cowl to the region of the wheel housing nesting with the tops and outer sides of the sills and secured thereto through said outer sides and having the wheel housing portion inwardly flanged, the flanges of said wheel housing portions resting on the tops of the sills and secured thereto.

In testimony whereof I hereunto affix my signature.

JOSEPH LEDWINKA.